Nov. 1, 1927.
M. W. MITCHELL
CONVEYER
Filed Aug. 6, 1923  3 Sheets-Sheet 1
1,647,370
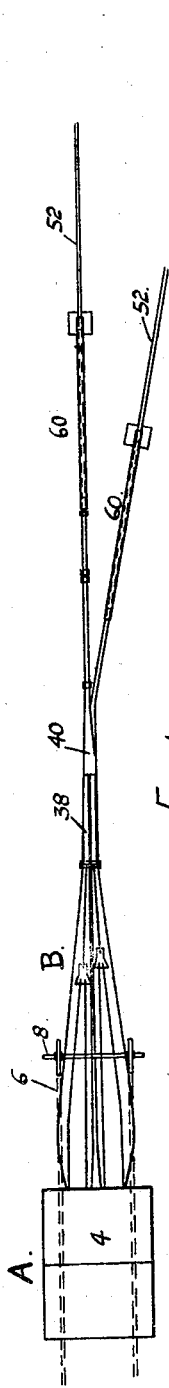
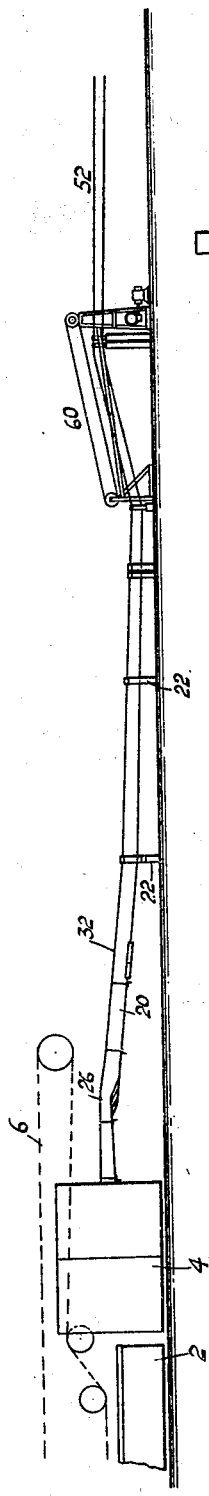
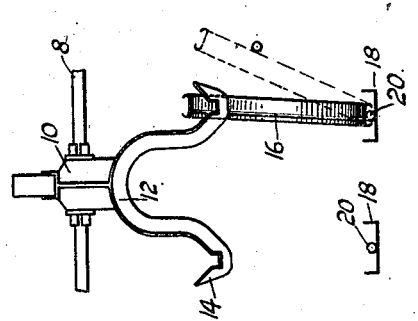
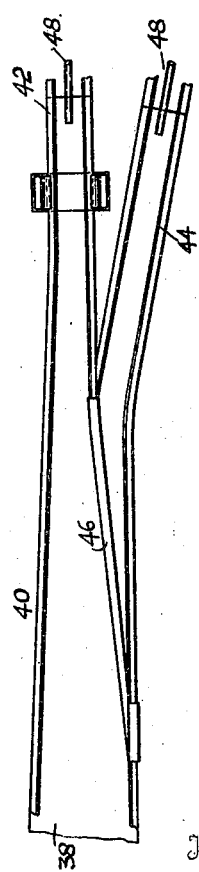
Inventor
MARION W. MITCHELL.

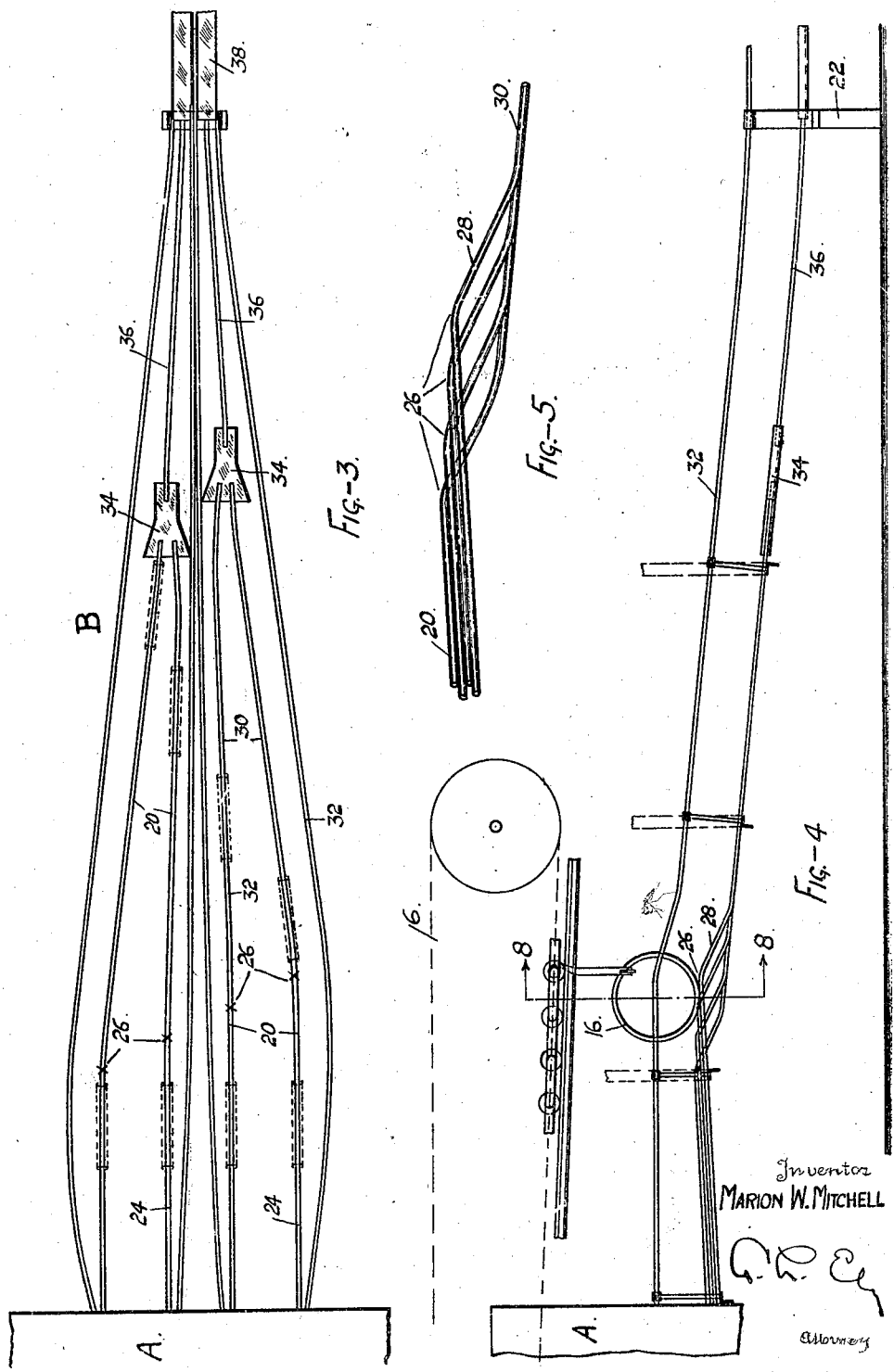

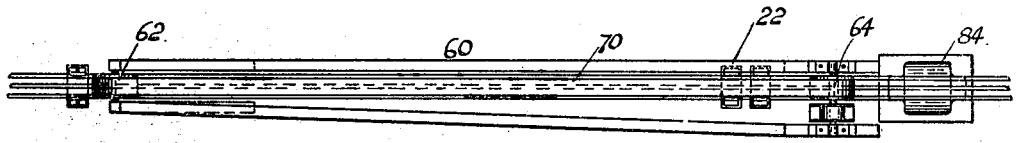
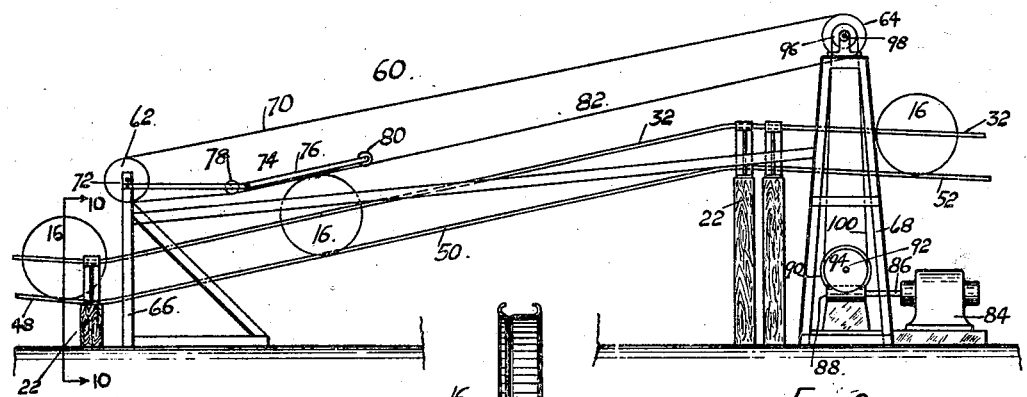
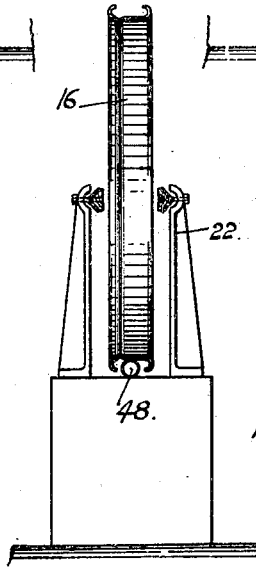

Patented Nov. 1, 1927.

1,647,370

UNITED STATES PATENT OFFICE.

MARION W. MITCHELL, OF AKRON, OHIO, ASSIGNOR TO THE FIRESTONE STEEL PRODUCTS COMPANY, OF AKRON, OHIO, A CORPORATION OF OHIO.

CONVEYER.

Application filed August 6, 1923. Serial No. 655,821.

This invention relates to a conveying mechanism and has particular reference to a conveyer for use in a rim factory, although it is applicable to other industries where similar or analogous operations are performed.

A general object of the invention is the provision of a system for handling rims or other annular objects which will introduce important economies in the removal of the rims from the plating apparatus and the conveyance to predetermined places.

In pursuance of this object, a system has been devised, as shown herein, wherein the rims are automatically delivered to a conveyer by which they are conveyed across the plating room and to a suitable place of discharge, which, preferably, is contiguous to the cars by which the rims are to be hauled away. Along the path of the conveyer, various stations are provided at which the final operations, such as inspection and distribution, are performed.

In the drawings there are shown such portions of a rim factory as will enable the construction and operation of the present invention to be understood, and while the present conveyer mechanism cooperates as a part of the whole system used in the manufacture of rims and renders it more efficient, it will be understood that the mechanism of this invention is not limited for use in the handling of rims, but is adaptable for the transfer of various articles in many industries.

It will also be understood that while shown in detail, the invention may be modified and changed as will be apparent to one skilled in the art without departing from the spirit of the invention or sacrificing any of the material benefits thereof.

In the drawings:

Figure 1 is a plan view of the conveying mechanism selected to illustrate the invention;

Figure 2 is a side elevation thereof, showing the discharging end of the plating apparatus;

Figure 3 is an enlarged plan of a portion of the conveyer;

Figure 4 is a side elevation of that portion of the conveyer shown in Figure 3;

Figure 5 is an enlarged view of the tracks showing the arrangement for taking the rims off the plating conveyer;

Figure 6 is a plan view of a portion of the conveyer, being a continuation of Figure 3;

Figure 7 is an enlarged view of a part of the conveyer showing the switch for the distribution of the rims;

Figure 8 is a part section on line 8—8 in Figure 4;

Figure 9 is a side elevation of the elevating device; and

Figure 10 is an enlarged section on the line 10—10 in Figure 9.

Referring to the drawings, A designates, as a whole, the unloading end of a plating apparatus having the usual plating tank 2 and a spraying cabinet 4. Above the tank is arranged an endless conveyer 6 adapted to transport the rims over the tank and immerse them in the baths contained therein. The conveyer 6 includes a number of transverse cross bars 8, each carrying a pair of duplicate swinging brackets 10 adapted to suspend the rims from the conveyer. Each bracket 10 is formed with a depending bifurcated portion 12 having the ends thereof arranged in a transverse plane with respect to the conveyer and outwardly and upwardly turned to provide hooked portions 14 upon which the annular rims 16 may be suspended for both vertical and rotary movement. It will be noted that the brackets are relatively arranged to support the rims in parallel rows.

The above mentioned general features of the construction of the plating apparatus constitute no part of the present invention and require no further description. This invention is concerned with novel means for removing the rims from the plating mechanism and conveying them automatically to various points of distribution.

To this end a conveyer B is arranged adjacent the plating apparatus, having its receiving end located beneath the path of travel of the plating conveyer 6. The conveyer B consists of a plurality of run-ways 18 in each of which is a rail or track 20 arranged below the rows of rims on the plating conveyer, the number of tracks corresponding to the number of rows of rims on the plating conveyer. The track-ways 18 are supported at suitable points along their length by uprights 22. The rails 20 are arranged in pairs and extend parallel to one another for a portion of their length, as at 24, the parallel portions of the tracks being inclined upwardly in the direction of the length of the conveyer. From an inspection of Figure 4, it will be seen that the lower portion of each rim will slide on one of the rails while still suspended by the hooks 14 on the transporting conveyer, and the incline of the rails will serve to raise the rims relative to the hooks until a point 26 is reached where the rims will be elevated sufficiently to clear the hooks in the manner shown in Figure 8. The points 26 are progressively arranged at greater distances along the length of the conveyer in such a manner as to cause the rims in the different rows to be discharged upon the rails at progressive intervals for a purpose to be pointed out hereinafter.

Beyond the point 26 the rails are provided with a sharp incline 28 which merges into a gradually inclined portion 30.

Extending parallel to the side rails and arranged to engage the sides of the rims are guide rails 32 against which the rims fall from the hooks 14. The side rails are inclined inwardly at that portion of their length above the incline 30 of the rails 20 so that the rims will be gradually raised from the inclined position shown in dotted lines in Figure 8 to a vertical position.

The portions 30 of the rails in each pair are inclined inwardly toward a point 34 where each pair of rails merges into a single rail 36 upon which the rims are conducted to a channeled run-way 38 which extends past an inspection station 40.

The arrangement of the point 26 in the tracks, so that the rims in each rail will be unloaded at progressive intervals, will prevent the rims from piling up at the points where the tracks merge, and permits the rims to be led in a single stream past the inspection station.

After the inspection operation, it is sometimes desirable to separate the rims according to sizes and to distribute them to various points about the factory. To this end the run-way 38 is provided with two branches 42 and 44 leading to different points, a switch 46 being provided to direct the rims into the appropriate branch. Within each track-way 42 and 44 is provided a rail or track 48 upon which the rims rest, each rail being provided with a comparatively steep inclined portion 50 which merges with a downwardly inclined portion 52 which leads to a storage room or to the cars in which the rims are to be shipped.

An elevating device, designed as a whole as 60, is utilized to move the rims up the incline 50. The elevator 60 consists of an idle pulley 62 and a driven pulley 64 suitably supported by standards 66 and 68 respectively above the track-way and a rim engaging belt 70 trained about the said pulleys. Pivoted to the standard 66 and 72 is a belt tightening device 74 consisting of a frame 76 in which is mounted belt engaging rollers 78 and 80. The device 74 serves to keep the lower rim 82 of the belt 70 in engagement with the rims to cause the latter to be rolled up the incline in a manner readily understood. Any convenient means for driving the pulley 64 may be employed, the illustrated embodiment consisting of an electric motor 84 suitably mounted adjacent the standard 68. The motor shaft 86 is provided with a worm 88 in mesh with a gear 90 upon one end of a shaft 92 mounted in the standard 68. Upon the other end of shaft 92 is a pulley 94 which is connected to a pulley 96 on the pulley shaft 98 by a belt 100.

By the construction and arrangement of the conveying mechanism above described, it is possible to reduce the handling and trucking of rims to a great extent, and the maximum production is possible at the greatest efficiency.

Having described my invention, what I claim as new and desire to secure by Letters Patent of the United States is:

1. In a device of the character described, an endless conveyer, hooks depending from said conveyer on which rims are suspended in parallel rows, means for removing a single rim from each row successively, and a second conveyer adapted to carry off the removed rims.

2. In a device of the character set forth, an inclined guideway down which rims may roll in a vertical plane, a gravity conveyer having its receiving end elevated above the discharging end of the guideway, and means for automatically transferring the rims from the guideway to the said conveyer.

3. In a device of the character set forth, an inclined guideway down which rims may roll in a vertical plane, a gravity conveyer having its receiving end elevated above the discharging end of the guideway, and means for automatically transferring the rims from the guideway to the said conveyer, the said means comprising an inclined track connecting the guideway with the conveyer and means for rolling the rims up the incline.

4. In a device of the character set forth, an inclined guideway down which rims may roll in a vertical plane, a distributing conveyer having its receiving end elevated above the discharging end of the guideway, an inclined track connecting the guideway and the conveyer, and means for rolling the rims up the track, the said means comprising a belt located above the track and adapted to engage the periphery of the rims.

5. In a device of the character described, an inclined guideway down which rims may roll in a vertical position, a distributing conveyer having its receiving end located above the discharging end of said guideway, an upwardly inclined track connecting the guideway and the conveyer, and means for rolling rims up the said track, the said means comprising an endless belt located above the track and having the lower run thereof engaging the periphery of the rims and means for driving the belt.

6. In a device of the character described, an inclined guideway down which rims may roll in a vertical position, a distributing conveyer having its receiving end located above the discharging end of said guideway, an upwardly inclined track connecting the guideway and the conveyer, and means for rolling rims up the said track, the said means comprising an endless belt located above the track and having the lower run thereof engaging the periphery of the rims, means for driving the belt, and means for holding the said run in frictional engagement with the rims.

7. In a device of the character described, an inspection station, a conveyer on which rims may roll comprising a plurality of units, a single unit into which the said units deliver, the said single unit leading past the inspection station, a plurality of units for removing rims from the inspection station, and means for allocating the rims to the removing units.

8. In a device of the character described, a plurality of guideways down which the rims may roll in a vertical plane, a single guideway into which the said guideways deliver, a plurality of distributing units, and means for delivering the rims from the single guideway to the distributing units.

9. In a device of the character described, a plurality of guideways down which the rims may roll in a vertical plane, a single guideway into which the said guideways deliver, a gravity conveyer having the receiving end located above the level of the single guideway, and an elevating device for hoisting the rims from the single guideway to the gravity conveyer.

10. In a device of the character described, an endless conveyer, hooks depending from said conveyer adapted to support rims thereon, and a second conveyer having its receiving end beneath one end of the endless conveyer, the said second conveyer consisting of a plurality of tracks on which the rims are adapted to rest, the said tracks being constructed to remove the rims automatically from the hooks.

11. In a device of the class described, a conveyer, means on said conveyer for supporting rims in longitudinal and transverse rows, a second conveyer having its receiving end adjacent one end of the first conveyer, the latter conveyer comprising a plurality of rim supporting tracks corresponding in number to the longitudinal rows of rims, the said tracks being constructed to remove the rims from the supporting means on the first conveyer and having an inclined portion down which the rims roll in a vertical plane, means for uniting the rims on each track into a single stream, and means for distributing the rims to various localities.

12. In a device of the character described, a conveyer, means on the conveyer for suspending rims in longitudinal and transverse rows in vertical planes, a second conveyer having its receiving end adjacent one end of the first conveyer, the second conveyer being provided with means for elevating the rims with respect to the said supporting means and for throwing them out of the vertical planes to clear the supporting means, means on the second conveyer for supporting the rims, means adapted to gradually return the rims to vertical planes above the said supporting means, a plurality of distributing conveyers having their receiving ends elevated above the discharging end of the second conveyer, and means for raising the rims to the level of the distributing conveyers.

13. In a device of the character described, an endless conveyer, hoops depending from said conveyer adapted to support rims in vertical planes in longitudinal and transverse rows, a second conveyer having its receiving end under one end of the endless conveyer, the said second conveyer consisting of a plurality of runways corresponding in number to the longitudinal rows of rims, a track in each of said runways on which the rims are adapted to rest, each of said trackways being provided with an upwardly inclined portion which elevates the rims with respect to the said hooks, and a curved portion which throws the rims out of the vertical planes to clear the hooks, the said curved portion in each rail being progressively advanced along the length of the conveyer to cause the rims in each transverse row to be removed from the hooks successively.

14. In a device of the character described, an endless conveyer, hooks depending from said conveyer adapted to suspend rims in parallel, longitudinal and transverse rows in vertical planes, a second conveyer having its receiving end under the discharging end of the first conveyer, the said second conveyer composed of a plurality of runways corresponding in number to the longitudinal rows of rims, a track in each of said runways on which the rims are adapted to rest, each of said tracks being provided with an upwardly inclined portion which elevates the rims with respect to the hooks and a curved portion which throws the rims out of the vertical planes to clear the hooks, the said curved portion in each rail being arranged at different distances along the length of the conveyer to cause the rims in each transverse row to be removed from the endless conveyer at successive time intervals, guide rails adapted to gradually bring the rims back to a vertical plane above the rails, the said trackways merging into a single guideway in which all of the rims pass in a single stream, an inspection station located adjacent the single guideway, a plurality of distributing conveyers having their receiving end elevated above the single trackway, inclined tracks connecting the trackway with each distributing conveyer, means for allocating the rims to each of the distributing conveyers, and means for rolling the rims up the inclined tracks onto the distributing conveyers.

MARION W. MITCHELL.